United States Patent
Brütt et al.

(10) Patent No.: US 10,744,982 B2
(45) Date of Patent: Aug. 18, 2020

(54) HYDRAULIC POWER BRAKE SYSTEM AND METHOD FOR ABS CONTROL

(71) Applicant: WABCO GmbH, Hannover (DE)

(72) Inventors: Mirko Brütt, Ronnenberg (DE); Michael Haverkamp, Hannover (DE)

(73) Assignee: WABCO GmbH, Hannover (DE)

( * ) Notice: Subject to any disclaimer, the term of this patent is extended or adjusted under 35 U.S.C. 154(b) by 213 days.

(21) Appl. No.: 16/012,942

(22) Filed: Jun. 20, 2018

(65) Prior Publication Data

US 2019/0016318 A1    Jan. 17, 2019

(30) Foreign Application Priority Data

Jul. 11, 2017   (DE) .................. 10 2017 006 540
Aug. 4, 2017   (DE) .................. 10 2017 007 409

(51) Int. Cl.

| | |
|---|---|
| *B60T 8/176* | (2006.01) |
| *B60T 13/66* | (2006.01) |
| *B60T 8/36* | (2006.01) |
| *B60T 8/171* | (2006.01) |
| *B60T 13/68* | (2006.01) |
| *B60T 17/22* | (2006.01) |
| *F16D 65/833* | (2006.01) |

(Continued)

(52) U.S. Cl.
CPC ............. *B60T 8/176* (2013.01); *B60T 8/171* (2013.01); *B60T 8/3675* (2013.01); *B60T 13/662* (2013.01); *B60T 13/686* (2013.01); *B60T 17/22* (2013.01); *F16D 65/833* (2013.01); *B60T 8/3605* (2013.01); *B60T 2270/10* (2013.01); *F16D 2065/783* (2013.01); *F16D 2066/001* (2013.01)

(58) Field of Classification Search
CPC ........ B60T 8/176; B60T 8/3605; B60T 8/171; B60T 13/686; B60T 17/22; B60T 2270/10; F16D 65/833; F16D 2065/783
See application file for complete search history.

(56) References Cited

U.S. PATENT DOCUMENTS 3,866,982 A * 2/1975 Geier .................... B60T 8/3605
                                                    303/118.1
5,971,503 A * 10/1999 Joyce .................... B60T 8/3675
                                                    303/191

(Continued)

FOREIGN PATENT DOCUMENTS

| DE | 19546056 A1 | 6/1997 |
| DE | 19744389    | * 4/1999 |

(Continued)

*Primary Examiner* — Vishal R Sahni (74) *Attorney, Agent, or Firm* — Dickinson Wright PLLC (57) ABSTRACT

A hydraulic power brake system (1) of a wheeled vehicle or for a vehicle unit has a main brake line (20, 21), in which a setpoint brake pressure can be controlled via a brake valve (4) that is operated via a brake pedal (7), and from which an axle brake line or a wheel brake line (46, 49, 50) branches off. Inlet valves and outlet valves and a pilot control valve of the ABS control system for the vehicle unit or for each vehicle axle are respectively disposed together in an ABS modulator block (69), which also includes a temperature sensor (70, 71, 72) for detecting the oil temperature (T) and a heating element (73, 74, 75) for locally heating the hydraulic oil are disposed in each ABS modulator block (69).

14 Claims, 3 Drawing Sheets

(51) Int. Cl.
*F16D 66/00* (2006.01)
*F16D 65/78* (2006.01)

(56) References Cited

U.S. PATENT DOCUMENTS

| | | | | |
|---|---|---|---|---|
| 2004/0150262 | A1* | 8/2004 | Gronau | B60T 8/36 303/191 |
| 2005/0200199 | A1* | 9/2005 | Kamiya | B60T 7/065 303/191 |
| 2006/0163939 | A1* | 7/2006 | Kuramochi | B60T 8/885 303/122.04 |
| 2008/0121476 | A1* | 5/2008 | James | F16D 65/853 188/264 D |
| 2011/0272230 | A1* | 11/2011 | Sekiya | B60T 1/10 188/70 R |
| 2017/0274882 | A1* | 9/2017 | Onodera | B60T 8/36 |

FOREIGN PATENT DOCUMENTS

| | | |
|---|---|---|
| DE | 19859737 A1 | 6/2000 |
| DE | 102015014205 A1 | 5/2017 |
| DE | 102015015472 A1 | 6/2017 |

* cited by examiner

HYDRAULIC POWER BRAKE SYSTEM AND METHOD FOR ABS CONTROL

TECHNICAL FIELD

The present disclosure concerns a hydraulic power brake system of a wheeled vehicle unit, which may be a vehicle or a trailer, with at least one main brake line in which a setpoint brake pressure can be controlled by a brake valve operated by a brake pedal, and from which at least one axle brake line or wheel brake line leading to a wheel brake actuating unit branches off, and with a valve arrangement of an ABS control system respectively comprising a hydraulic pressure-controlled inlet valve that is disposed between the main brake line and the respective axle brake line or wheel brake line, and a hydraulic pressure-controlled outlet valve that is disposed between the respective axle brake line or wheel brake line and an unpressurised return line, and at least one electromagnetically operated pilot control valve that is connected upstream of each inlet valve and outlet valve, wherein at least one temperature sensor for detecting the oil temperature and at least one heating element for heating hydraulic oil is provided, and wherein the inlet valves and outlet valves and the pilot control valves of the ABS control system for each vehicle unit or for each vehicle axle are each disposed together in an ABS modulator block. Moreover, the disclosure concerns a method for ABS control system of a hydraulic power brake system of this type.

BACKGROUND

Whereas passenger vehicles and light utility vehicles usually comprise a pedal power assisted hydraulic brake system and heavier utility vehicles comprise a pneumatic power brake system, wheeled vehicles that are provided for off-highway use, such as construction machinery and agricultural tractors, are fitted with a boosted hydraulic brake system, which is referred to here as a hydraulic power brake system. Because of the required high brake forces with this type of wheeled vehicle, the actuating units of the wheel brakes, such as the wheel brake cylinders and brake calipers, comprise a relatively large displacement volume, which can only be supplied with a power brake system. Because construction machinery and agricultural tractors usually comprise hydraulic working units or even a hydrostatic drive, a hydraulic power brake system can advantageously use the already present hydraulic pressure supply system.

In DE 195 46 056 A1 and DE 198 59 737 A1, hydraulic power brake systems of a motor vehicle are described, each of which comprises two brake circuits, a valve arrangement of an ABS control system and a valve arrangement of an ASR control. The inlet valves and the outlet valves of the valve arrangement of the ABS control system are each embodied there as 2/2-way solenoid valves. In the case of the valve arrangement of the ABS control system according to DE 195 46 056 A1, safety valves are embodied as non-return valves that are disposed parallel to the inlet valves. By contrast, the valve arrangement of the ABS control system according to DE 198 59 737 A1 comprises non-return valves or non-return valve functions that are integrated within the inlet valves for this.

Because of the directly electromagnetically operated inlet valves and outlet valves of the ABS control system, the known power brake systems are only suitable for passenger vehicles and lighter utility vehicles. With larger and heavier utility vehicles, especially with construction machinery and tractor vehicles provided for off-highway use, the actuating units of the wheel brakes, such as wheel brake cylinders and brake calipers, are dimensioned to be suitably large for producing the required brake forces, so that the displacement volume of the hydraulic oil to be moved in each of the actuating units during braking processes is often at least 15 cm$^3$. For passing through and shutting off such large displacement volumes, relatively large solenoid valves with very high current drain of the suitably dimensioned magnetic coils are necessary. Because of the high inductivity of the magnetic coils, suitably implemented inlet valves and outlet valves would comprise long switching times corresponding to the slow build-up and decline of the magnetic fields and would only enable a low ABS control system frequency.

To avoid the disadvantage, in DE 10 2015 014 205 A1 a hydraulic power brake system is presented, with which the inlet valves and outlet valves of the ABS control system are embodied as hydraulic pressure-controlled switching valves. For actuation, either a 3/2-way solenoid valve or two 2/2-way solenoid valves may be associated with the inlet valves and outlet valves, respectively, via which the control inputs of the inlet valves and outlet valves can be alternately connected to a pressurized control pressure line or to an unpressurised return line. The control pressure lines branch off from a control pressure main line that is connected to a main brake line carrying a variable brake pressure.

Because the switching speed of the inlet valves and outlet valves of the ABS control system and hence the possible level of the ABS control system frequency reduces with reducing sound pressure, in DE 10 2015 015 472.9, which has not previously been published, the inventor proposed a hydraulic power brake system with which the inlet valves and outlet valves of the ABS control system are embodied as hydraulic or pneumatic pressure-controlled switching valves. So that the ABS control system is independent of the brake pressure that is controlled in the main brake line via the brake valve, the control pressure lines are connected via a control pressure main line to a main pressure line of a hydraulic or pneumatic pressure supply system.

The switching speed of the inlet valves and outlet valves and the pilot control valves of the ABS control system, and hence the possible level of the ABS control system frequency, are however also dependent on the temperature-dependent viscosity of the hydraulic oil that is used with hydraulic actuation. Therefore, in DE 10 2015 015 472.9 it is also proposed to provide a temperature sensor for detecting the oil temperature and a heating element for heating the available hydraulic oil. The temperature sensor and the heating element are preferably disposed on or in a storage container of the hydraulic pressure supply system.

To reduce the costs of manufacturing and assembly, the inlet valves and outlet valves and the pilot control valves of the ABS control system are usually disposed together in an ABS modulator block either for each vehicle unit (towing vehicle, trailer) or for each vehicle axle (front axle, rear axle). To protect against harmful ambient influences and mechanical damage, the ABS modulator blocks are attached to the frame of the vehicle at a suitable point very close to the actuating units of the wheel brakes. This necessarily results in greater distances between the hydraulic pressure supply system and the ABS modulator blocks, which are bridged by suitably long control pressure main lines. Hydraulic oil heated in the pressure supply system when needed therefore cools again in cold and humid weather conditions on its way to the ABS modulator blocks by thermal conduction and convection, so that the desired effect, namely to achieve a rapid response of the inlet valves and outlet valves of the ABS control system owing to low viscosity of the hydraulic oil, can fail to materialize or at least be highly attenuated.

It is the object of the present disclosure to propose a hydraulic power brake system of a wheeled vehicle of the aforementioned design type with improved operating characteristics of the ABS control system. Moreover, a method for ABS control of a hydraulic power brake system of this type will be presented.

The disclosure therefore concerns a hydraulic power brake system of a wheeled vehicle with at least one main brake line, in which a setpoint brake pressure can be controlled by a brake valve that is operated by a brake pedal, and from which at least one axle brake line or wheel brake line leading to an actuating unit of at least one wheel brake branches off, and with a valve arrangement of an ABS control system respectively comprising a hydraulic pressure-controlled inlet valve that is disposed between the main brake line and the respective axle brake line or wheel brake line, and a hydraulic pressure-controlled outlet valve that is disposed between the respective axle brake line or wheel brake line and an unpressurised return line, and at least one electromagnetically operated pilot control valve that is connected upstream to each inlet valve and outlet valve, wherein at least one temperature sensor for detecting the oil temperature and at least one heating element for heating hydraulic oil are provided, and wherein the inlet valves and outlet valves and the pilot control valves of the ABS control system are respectively disposed together in an ABS modulator block for each vehicle unit or for each vehicle axle.

To achieve the stated object, with the power brake system, it is provided that at least one temperature sensor for detecting the oil temperature and at least one heating element for heating the hydraulic oil that is used locally for control are disposed in each ABS modulator block. This enables in each case the local oil temperature of the hydraulic oil in the ABS modulator blocks close to the wheel brake to be detected and the hydraulic oil to be locally heated when needed, by activating the respective heating element and as a result to reduce the viscosity of the hydraulic oil. Possible cooling of the hydraulic oil in the path between a distant reservoir container and the ABS modulator blocks is compensated by increasing the temperature.

Because the switching speed of the inlet valves and outlet valves and hence the level of the ABS control system frequency substantially depends on the viscosity of the hydraulic oil that is used for control, in order to increase the accuracy of the temperature detection and the effectiveness of the heating of the hydraulic oil, it is preferably provided that the temperature sensor and the heating element are disposed close to the respective pilot control valves within the respective ABS modulator block.

A further increase in the accuracy of the temperature detection and the effectiveness of the heating of the hydraulic oil can be achieved by disposing a temperature sensor and a heating element are close to the associated pilot control valves in at least one ABS modulator block for each pair of inlet valves and outlet valves of the axle brake lines or the wheel brake lines.

The effectiveness of the heating of the hydraulic oil that is used for control can also be increased as a result of the fact that at least one ABS modulator block is provided with thermal insulation at least close to the pilot control valves that shields against the surroundings. The heat loss of the hydraulic oil into the surroundings by heat conduction and convection and the necessary heating power of the respective heating element is reduced by the thermal insulation.

The heating elements are preferably embodied as electrical heating bodies, each of which can be alternately connected to or disconnected from an electrical power supply of the wheeled vehicle via an actuatable electrical switch or a relay.

Alternatively, it can be provided that at least one heating element is embodied as an electrical heating body that can be alternately connected to or disconnected from an electrical power supply of the wheeled vehicle under self-control and depending on the prevailing temperature via a bimetallic switch that is integrated within or on a pilot control valve.

It is also possible, however, that the heating elements are embodied as oil heat exchangers, each of which can be alternately connected to or isolated from a cooling oil circuit of an oil pump of a hydraulic pressure supply system or a combustion engine or a driving gearbox or a working gearbox of the wheeled vehicle via an actuatable solenoid valve that is disposed in the feed or return.

Likewise, the heating elements can also be embodied as water heat exchangers, each of which can be alternately connected to or shut off from a cooling water circuit of a combustion engine of the wheeled vehicle via an actuatable solenoid valve that is disposed in the feed or return.

The disclosure also concerns a method for ABS control of a hydraulic power brake system of a wheeled vehicle comprising at least one main brake line, in which a setpoint brake pressure can be controlled by a brake valve that can be actuated by a brake pedal, and from which at least one axle brake line or wheel brake line leading to an actuating unit of at least one wheel brake branches off. Moreover, the power brake system comprises a valve arrangement of an ABS control system, which respectively comprises a hydraulic pressure-controlled inlet valve that is disposed between the main brake line and the respective axle brake line or wheel brake line, and a hydraulic pressure-controlled outlet valve that is disposed between the respective axle brake line or wheel brake line and an unpressurised return line. Further, the power brake system comprises at least one electromagnetically operated pilot control valve that is connected upstream of each inlet valve and outlet valve, and at least one temperature sensor for detecting the oil temperature and a heating element for heating hydraulic oil.

To achieve the method-related object for control of the hydraulic power brake system of a wheeled vehicle, it is provided that the local oil temperature of the hydraulic oil that is used for actuation of the inlet valves and outlet valves is measured by at least one temperature sensor that is disposed close to the pilot control valves of at least one pair of inlet valves and outlet valves of an axle brake line or a wheel brake line, and that at least one heating element that is disposed close to the same pilot control valves is switched on if the detected oil temperature has reached or fallen below a specified switch-on limit value $T_{H\_on}$, and is then switched off if the detected oil temperature has reached or exceeded a specified switch-off limit value $T_{H\_off}$, which is greater than the switch-on limit value $T_{H\_on}$.

The oil temperature of the hydraulic oil that is used for actuation of the inlet valves and outlet valves is thus detected close to the wheel brakes, and the respective hydraulic oil is heated locally when needed for reducing the viscosity. In this manner, the accuracy of the temperature detection of the hydraulic oil is increased on the one hand, and the required heating power for heating the hydraulic oil is reduced on the other hand.

In addition, according to a development of this method it is provided that the ABS control system is deactivated if the detected oil temperature T has reached or fallen below a specified operating limit value $T_{ABS\_on}$, which is greater than a minimum limit value $T_{ABS\_min}$ for satisfying the legal requirements on the ABS control system ($T_{ABS\_on} > T_{ABS\_min}$) and is less than the switch-on limit value $T_{H\_on}$ of the heating element ($T_{ABS\_on} < T_{H\_on}$), ($T \leq T_{ABS\_on}$). Owing to the separation of the operating limit value $T_{ABS\_on}$ from the minimum limit value $T_{ABS\_min}$, possible measuring inaccuracies during the sensor detection of the oil temperature T and a possible non-uniform temperature distribution within the respective ABS modulator block are taken into account, so that the ABS control system reliably satisfies the legal requirements in the activated state.

When the ABS control system is deactivated, an optical and/or acoustic warning signal is preferably output in the driver's cab of the wheeled vehicle in order to inform the driver of the non-availability of the ABS control system and to drive cautiously. The output of the warning signals can for example be carried out by permanent or flashing illumination of a suitably characterized warning light in the instrument panel of the driver's cab, by outputting a permanent or interrupted warning note by a loudspeaker and/or by written information on a display.

BRIEF DESCRIPTION OF THE DRAWINGS

For further clarification of the disclosure, the description is accompanied by a drawing with an exemplary embodiment and with diagrams. In the figures FIG. 3b shows the temperature-dependent viscosity of some hydraulic oils in an enlarged section of the diagram according to FIG. 3a.

DETAILED DESCRIPTION OF THE DRAWINGS

Figure 3A:
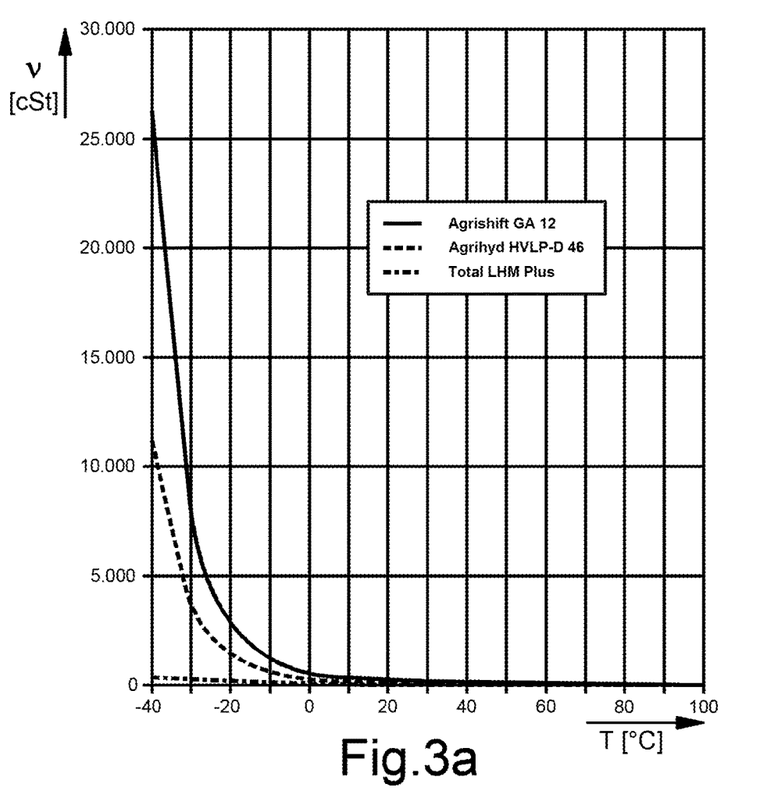
FIG. 3a shows the temperature-dependent viscosity of some hydraulic oils in the form of a diagram.
Figure 3B:
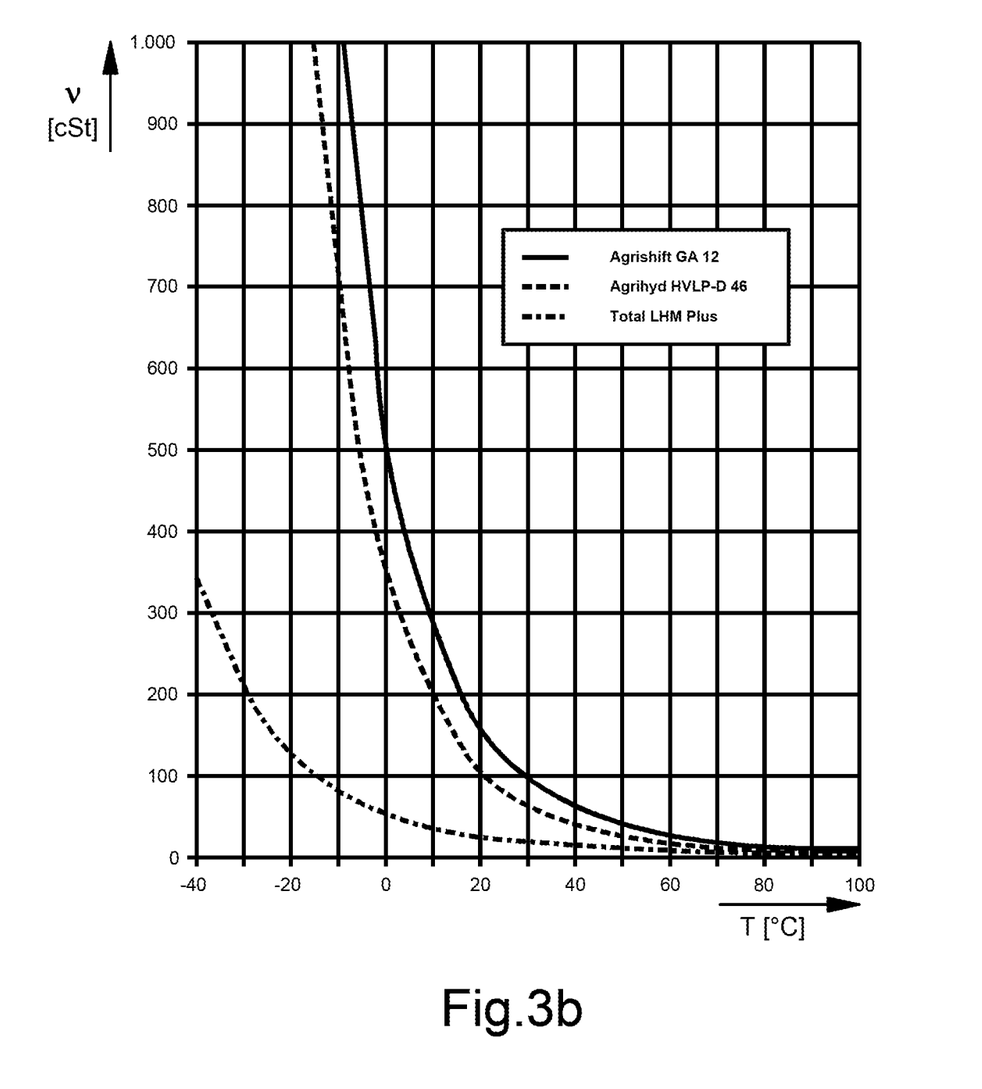

From the diagram of FIG. 3a and the diagram according to FIG. 3b representing the enlarged section of the diagram of FIG. 3a, it can be seen that the hydraulic oils Agrishift GA 12 and Agrihyd HVLP-D 46 that are often used as brake fluid, gearbox oil and servo oil in agricultural machinery, such as tractor vehicles and harvesting machines, have a large rise in kinematic viscosity ν at oil temperatures T below 20° C. With the use of the hydraulic oils as brake fluid in hydraulic power brake systems, in which the pilot control valves and the inlet valves and outlet valves of an ABS control system are actuated hydraulically, it is therefore useful to heat the hydraulic oil at least in the vicinity of the pilot control valves when required, i.e. in the presence of a low oil temperature. This reduces the kinematic viscosity ν of the hydraulic oil that is used for actuation of the inlet valves and outlet valves, which results in shorter switching times of the inlet valves and outlet valves and thus enables a higher ABS control system frequency.

In the diagrams of FIG. 3a and FIG. 3b, the temperature-dependent viscosity profile of the hydraulic oil Total LHM Plus is shown for comparison. The hydraulic oil, which was specially developed for use in in hydropneumatic suspension systems and brake systems of certain models of passenger vehicles, has a markedly smaller rise in kinematic viscosity ν at oil temperatures T below 20° C. However, it is not yet used in agricultural machinery.

Figure 1:
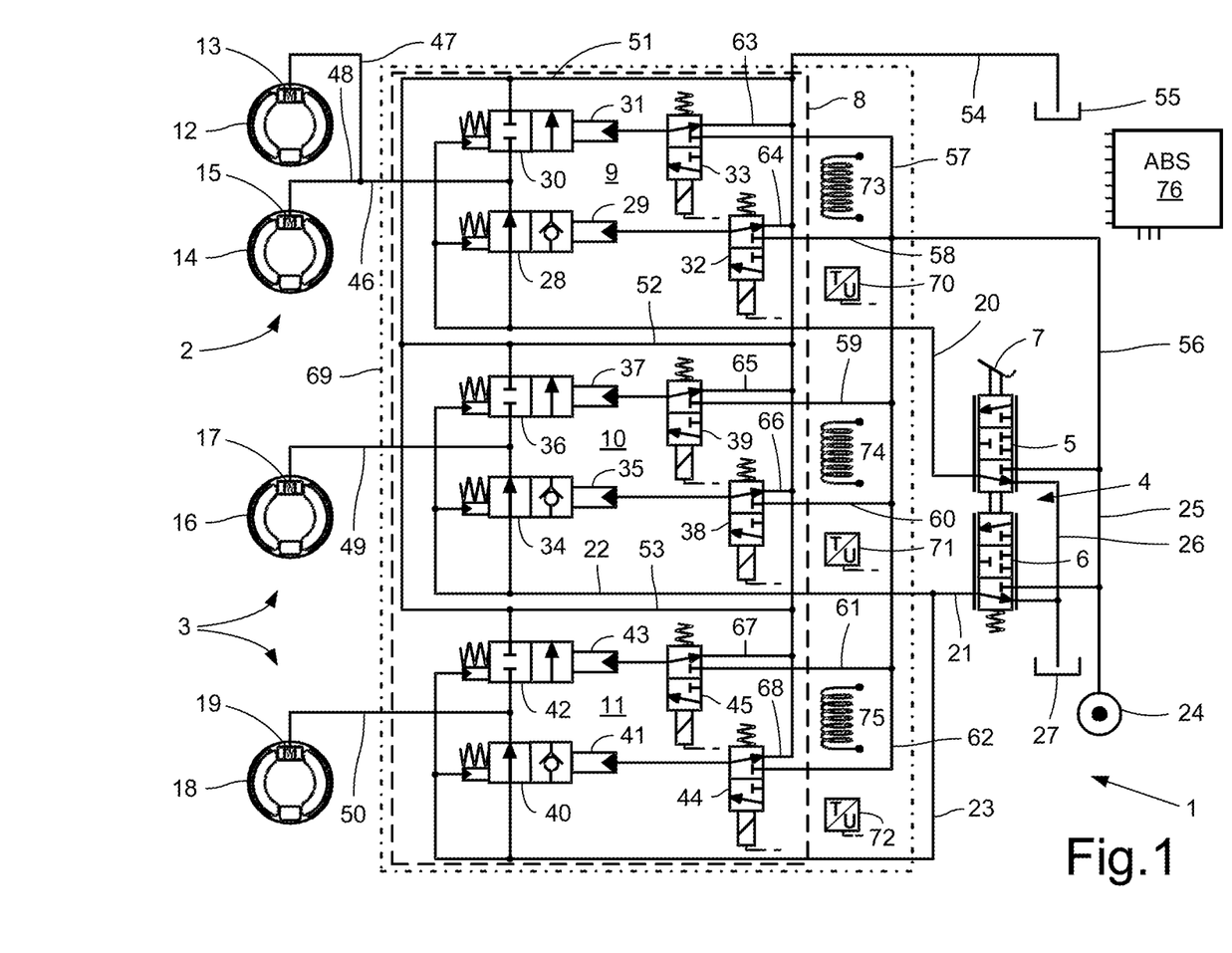
FIG. 1 shows a hydraulic power brake system with an ABS control system according to a first aspect of the present invention in a schematic view.

In the schematic overview representation of FIG. 1, a hydraulic power brake system 1 of a wheeled vehicle is shown, in which a device according to the invention is provided for detecting the oil temperature T and for heating the hydraulic oil that is used for control when needed.

The hydraulic power brake system 1 comprises two brake circuits 2, 3 and comprises a brake valve 4, a valve arrangement 8 of an ABS control system comprising three functional groups 9, 10, 11 and a plurality of actuating units 13, 15, 17, 19 of wheel brakes 12, 14, 16, 18 of two vehicle axles of the wheeled vehicle. The wheel brakes 12, 14, 16, 18 are implemented as drum brakes in the present case by way of example, and the actuating units 13, 15, 17, 19 are accordingly embodied as wheel brake cylinders. Via the brake valve 4, which contains two 3/3-way proportional valves 5, 6 and which is operated by a driver via brake pedal 7, a first main brake line 20 of the first brake circuit 2 and a second main brake line 21 of the second brake circuit 3 can each be connected for metered control of a brake pressure with more or less throttling to a pressurized main pressure line 25 of a pressure oil source 24 and an unpressurised return line 26 leading into an oil sump or a reservoir container 27.

The three functional groups 9, 10, 11 of the ABS control system each comprise an inlet valve 28, 34, 40 and an outlet valve 30, 36, 42, which are embodied as hydraulic pressure-controlled 2/2-way switching valves, and each comprises a pilot control valve 32, 33; 38, 39; 44, 45 embodied as a 3/2-way magnetic switching valve for each inlet valve or outlet valve 28, 30, 34, 36, 40, 42.

An axle brake line 46 of the first brake circuit 2, from which two wheel brake lines 47, 48 leading to the wheel brake cylinders 13, 15 of the front axle branch off, can be alternately connected to the main brake line 20 of the first brake circuit 2 or an unpressurised return line 51 via the inlet valve 28 and the outlet valve 30 of the first functional group 9 of the ABS control system. The return line 51 is connected to a collecting return line 54 that leads into an oil sump or a reservoir container 55.

Via the pilot control valves 32, 33, the control inputs 29, 31 of the associated inlet valves and outlet valves 28, 30 can each be alternately connected to a pressurized control pressure line 57, 58, which is respectively connected to a main control pressure line 56 that is connected to the main pressure line 25, or to an unpressurised return line 63, 64 that is connected to the collecting return line 54.

The main brake line 21 of the second brake circuit 3 branches into a first main brake line branch 22 and a second main brake line branch 23. A first wheel brake line 49 of the second brake circuit 3, which leads to the wheel brake cylinder 17 of the wheel brake 16 of the right vehicle wheel of the rear axle, can be alternately connected to the first main brake line branch 22 of the second main brake line 21, or to an unpressurised return line 52 that is connected to the collecting return line 54, via the inlet valve 34 and the outlet valve 36 of the second functional group 10 of the ABS control system.

Via the pilot control valves 38, 39, the control inputs 35, 37 of the associated inlet valves and outlet valves 34, 36 can each be alternately connected to a pressurized control pressure line 59, 60, which is respectively connected to the main control pressure line 56 or to an unpressurised return line 65, 66 that is connected to the collecting return line 54.

A second wheel brake line 50 of the second brake circuit 3, which leads to the wheel brake cylinders 19 of the wheel brake 18 of the left vehicle wheel of the rear axle, can be alternately connected to the second main brake line branch 23 of the second main brake line 21 or to an unpressurised return line 53 that is connected to the collecting return line 54, via the inlet valve 40 and the outlet valve 42 of the third functional group 11 of the ABS control system.

Via the pilot control valves 44, 45, the control inputs 41, 43 of the associated inlet valves and outlet valves 40, 42 can each be alternately connected to a pressurized control pressure line 61, 62, each of which is connected to the main control pressure line 56, or to an unpressurised return line 67, 68 that is connected to the collecting return line 54.

In the non-actuated state of the respective inlet valve 28, 34, 40, i.e. the state with zero control pressure, the respective axle brake line or wheel brake line 46, 49, 50 is connected to the associated main brake line 20, 21, and the respective wheel brakes 12, 14 or the respective wheel brake 16, 18 is or are actuated with the setpoint brake pressure. In the actuated state of a control input 29, 35, 41, i.e. the state with a control pressure applied, of the respective inlet valve 28, 34, 40, the respective axle brake line or wheel brake line 46, 49, 50 is shut off from the associated main brake line 20, 21. However, via a non-return valve that is integrated within the respective inlet valve 28, 34, 40, a decrease in pressure in the respective axle brake line or wheel brake line 46, 49, 50 is then possible via the associated main brake line 20, 21 and the brake valve 4, which comes into effect in the event of a temporary release of the brake pedal 7 and a resulting reduced setpoint brake pressure.

With the respective outlet valve 30, 36, 42 in the non-actuated state, i.e. with zero control pressure, the respective axle brake line or wheel brake line 46, 49, 50 is shut off from the associated return line 51, 52, 53. With the respective outlet valve 30, 36, 42 in the actuated state, i.e. with a control input 31, 37, 43 subjected to a control pressure, the respective axle brake line or wheel brake line 46, 49, 50 is connected to the associated return line 51, 52, 53 so that the associated wheel brake cylinders 13, 15 are pressureless and the respective wheel brakes 12, 14 are released or the associated wheel brake cylinder 17, 19 is pressureless and the respective wheel brake 16, 18 is released.

During an ABS control operation, in which the pilot control valves 32, 33; 38, 39; 44, 45 are controlled, via electrical control lines, by an electronic ABS control unit 76, by alternately opening and closing the respective inlet valves 28, 34, 40 and outlet valves 30, 36, 42, the brake pressure prevailing in the respective axle brake line or wheel brake line 46, 49, 50 and acting in the wheel brake cylinders 13, 15 of the wheel brakes 12, 14 or in the wheel brake cylinder 17, 19 of the wheel brake 16, 18 is modulated in such a way that locking of the respective vehicle wheels or the respective vehicle wheel is prevented, and as a result the wheeled vehicle remains able to be braked and steered. Because the control pressure is tapped via the main control pressure line 56 on the main pressure line 25, which is at a constantly high oil pressure, the changeover of the inlet valves and outlet valves 28, 30; 34, 36; 40, 42 during ABS control system is always carried out at the same rate independently of the setpoint brake pressure that is controlled via the brake valve 4 in the two main pressure lines 20, 21.

In the present case, the inlet valves and outlet valves 28, 30; 34, 36; 40, 42 and the pilot control valves 32, 33; 38, 39; 44, 45 of the three functional groups 9, 10, 11 of the ABS control system are disposed together in an ABS modulator block 69 that is mounted remotely from the pressure oil source 24 at a suitable point on the vehicle frame of the wheeled vehicle. In order to enable switching times of the inlet valves and outlet valves 28, 30; 34, 36; 40, 42 of essentially the same rate, and thus an equally ABS control system frequency regardless of current weather conditions, especially at low ambient temperature, a device is provided for detecting the oil temperature T and for heating the hydraulic oil that is used for control when needed.

For detecting the oil temperature T of the hydraulic oil used for actuation of the inlet valves and outlet valves 28, 30; 34, 36; 40, 42, a temperature sensor 70, 71, 72 is disposed close to the respective pilot control valves 32, 33; 38, 39; 44, 45 in each functional group 9, 10, 11 of the ABS control system. For heating the hydraulic oil that is used for actuation of the inlet valves and outlet valves 28, 30; 34, 36; 40, 42 when needed, in addition a heating element 73, 74, 75 that can be switched on and switched off is disposed close to the respective pilot control valves 32, 33; 38, 39; 44, 45 in each functional group 9, 10, 11 of the ABS control system. Instead of a temperature sensor 70, 71, 72 and a heating element 73, 74, 75 for each functional group 9, 10, 11 of the ABS control system, only one temperature sensor 71 and a heating element 74 could also be disposed centrally in the ABS modulator block 69 close to the pilot control valves 32, 33; 38, 39; 44, 45, as long as the pilot control valves 32, 33; 38, 39; 44, 45 are disposed structurally close to each other.

The temperature sensors 70, 71, 72 are connected via sensor lines to the electronic ABS control unit 76 for analyzing the detected oil temperature values T. The heating elements 73, 74, 75 preferably embodied as an electrical heating body are for example connected via a relay to an electrical voltage source, which can be actuated by the electronic ABS control unit 76, so as to be able to be switched on and off. The actuation is carried out depending on the temperatures determined by the temperature sensors 70, 71, 72. If the mentioned relay is not available, the heating elements 73, 74, 75 can also be actuated in a self-controlling manner via a bimetallic switch that is integrated within or on a pilot control valve 32, 33; 38, 39; 44, 45 depending on the temperature prevailing there.

Figure 2:
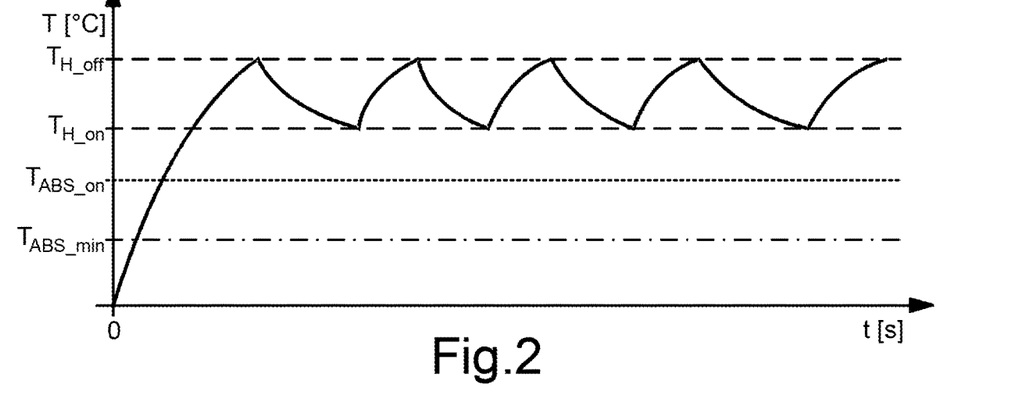
FIG. 2 shows a brake pressure profile of an ABS control system of the hydraulic power brake system according to FIG. 1 in the form of a diagram.

The temperature-dependent switching on and off of the heating elements 73, 74, 75 is described below using the temperature diagram of FIG. 2.

On starting the wheeled vehicle at time t=0, the heating elements 73, 74, 75 are switched on because the oil temperature T detected via the temperature sensors 70, 71, 72 of the hydraulic oil that is used for control is less than a specified switch-on limit value $T_{H\_on}$ ($T<T_{H\_on}$). The ABS control system is initially deactivated because the detected oil temperature T is also below a specified operating limit value $T_{ABS\_on}$. The operating limit value $T_{ABS\_on}$ of the ABS control system is greater than a minimum limit value $T_{ABS\_min}$ for satisfying the legal requirements and below the switch-on limit value $T_{H\_on}$ of the heating elements 73, 74, 75 ($T_{ABS\_min}<T_{ABS\_on}<T_{H\_on}$). Owing to the separation of the operating limit value $T_{ABS\_on}$ from the minimum limit value $T_{ABS\_min}$, possible measuring inaccuracies in the sensor detection of the oil temperature T and a possible unequal temperature distribution within the ABS modulator block 69 are taken into account, so that in the activated state the ABS control system reliably meets the legal requirements.

If the oil temperature T of the hydraulic oil has reached or exceeded the operating limit value $T_{ABS\_on}$ of the ABS control system, the ABS control system is activated, whereby the braking and steering capability of the wheeled vehicle is markedly improved. Once the oil temperature T of the hydraulic oil has reached or exceeded a specified switch-off limit value $T_{H\_off}$ of the heating elements 73, 74, 75, which is greater than the switch-on limit value $T_{H\_on}$ ($T_{H\_off}>T_{H\_on}$), ($T \geq T_{H\_off}$), the heating elements 73, 74, 75 are switched off, so that the oil temperature T of the hydraulic oil reduces again. If the oil temperature T of the hydraulic oil has then reached or fallen below the switch-on limit value $T_{H\_on}$ of the heating elements 73, 74, 75 ($T \leq T_{H\_on}$), the heating elements 73, 74, 75 are switched on again. Subsequently, owing to the switching off and on of the heating elements 73, 74, 75 a sawtooth-like profile of the oil temperature T results that lies between the switch-on limit value $T_{H\_on}$ and the switch-off limit value $T_{H\_off}$ of the heating elements 73, 74, 75.

Owing to the described heating of the hydraulic oil that is used for control, when starting the wheeled vehicle in cold weather conditions a high switching speed of the inlet valves and outlet valves 28, 30; 34, 36; 40, 42 of the ABS control system and hence a high ABS control frequency is reached relatively rapidly and is subsequently held at a uniformly high level.

While the above description constitutes the preferred embodiments of the present invention, it will be appreciated that the invention is susceptible to modification, variation and change without departing from the proper scope and fair meaning of the accompanying claims.

What is claimed is:

1. A hydraulic power brake system (1) for a wheeled vehicle unit, comprising:
    a pressure oil source (24) supplying pressurized hydraulic oil serving as pressure medium,
    a main brake line (20, 21), configured to provide a setpoint brake pressure controlled via a brake valve (4) that is downstream of the pressure oil source and operated via a brake pedal (7), and from which an axle brake line or wheel brake line (46, 49, 50) leading to an actuating unit (13, 15, 17, 19) of a wheel brake (12, 14, 16, 18) branches off,
    a valve arrangement (8) of an ABS control system, which comprises respectively a hydraulic pressure-controlled inlet valve (28, 34, 40) disposed between the main brake line (20, 21) and a respective axle brake line or wheel brake line (46, 49, 50), and a hydraulic pressure-controlled outlet valve (30, 36, 42) disposed between the respective axle brake line or wheel brake line (46, 49, 50) and an unpressurised return line (51, 52, 53), and a respective pressure control line with an electromagnetically operated pilot control valve (32, 33, 38, 39, 44, 45) connected to a control input (29, 35, 41, 31, 37, 43) of each inlet valve and outlet valve (28, 30, 34, 36, 40, 42), wherein each respective pressure control line is connected to the pressure source (24) by bypassing the brake valve (4),
    wherein the inlet valve and outlet valve (28, 30, 34, 36, 40, 42) and the pilot control valves (32, 33, 38, 39, 44, 45) of the ABS control system for the vehicle unit or for each vehicle axle respectively are disposed together in a respective ABS modulator block (69), wherein a temperature sensor (70, 71, 72) for detecting a local oil temperature T and a heating element (73, 74, 75) for locally heating the hydraulic oil are disposed in each respective ABS modulator block (69).

2. The hydraulic power brake system as claimed in claim 1, wherein the temperature sensor (70, 71, 72) and the heating element (73, 74, 75) are disposed close to the pilot control valves (32, 33, 38, 39, 44, 45) within the respective ABS modulator block (69).

3. The hydraulic power brake system as claimed in claim 2, wherein in at least one of the respective ABS modulator blocks (69), the temperature sensor (70, 71, 72) and the heating element (73, 74, 75) are disposed close to the pilot control valves (32, 33, 38, 39, 44, 45) for each pair of inlet valves and outlet valves (28, 30, 34, 36, 40, 42) of the axle brake lines or wheel brake lines (46, 49, 50).

4. The hydraulic power brake system as claimed in claim 1, wherein the respective ABS modulator block (69) is shielded by a thermal insulation against the surroundings, at least in the vicinity of the pilot control valves (32, 33, 38, 39, 44, 45).

5. The hydraulic power brake system as claimed in claim 1, wherein the heating element (73, 74, 75) is embodied as an electrical heating body configured to be alternately connected to or disconnected from an electrical power supply of the wheeled vehicle unit via an actuatable electrical switch.

6. The hydraulic power brake system as claimed in claim 1, wherein the heating element (73, 74, 75) is embodied as an electrical heating body that is configured to be alternately connected to or disconnected from an electrical power supply of the wheeled vehicle unit in a self-controlling manner via a bimetallic switch that is integrated within the heating element or on a pilot control valve (32, 33; 38, 39; 44, 45) depending on a prevailing temperature.

7. The hydraulic power brake system as claimed in claim 1, wherein the heating element (73, 74, 75) is embodied as an oil heat exchanger that is alternately connected to or disconnected from a cooling oil circuit of an oil pump of a hydraulic pressure supply system or a combustion engine or a driving gearbox or a working gearbox of the wheeled vehicle unit via an actuatable solenoid valve that is disposed in a feed line or return line of the oil heat exchanger.

8. The hydraulic power brake system as claimed in claim 1, wherein the heating element (73, 74, 75) is embodied as a water heat exchanger that is alternately connected to or disconnected from a cooling water circuit of a combustion engine associated with the wheeled vehicle unit via an actuatable solenoid valve that is disposed in a feed line or return line of the water heat exchanger.

9. A method for ABS control of a hydraulic power brake system (1) of a wheeled vehicle unit according to claim 1, the method comprising the steps of
    locally measuring the temperature (T) of the hydraulic oil via the temperature sensor (73, 74, 75), and
    activating the heating element (73, 74, 75) when the measured oil temperature (T) has reached or fallen below a specified switch-on limit value $T_{H\_on}$, and deactivating the heating element when the detected oil temperature (T) has reached or exceeded a specified switch-off limit value $T_{H\_off}$ that is greater than the switch-on limit value $T_{H\_on}$.

10. The method for ABS control as claimed in claim 9, comprising the further step of deactivating the ABS control system when the detected oil temperature (T) has reached or fallen below a specified operating limit value $T_{ABS\_on}$ that is greater than a minimum limit value $T_{ABS\_min}$ for satisfying predetermined minimum requirements on the ABS control system ($T_{ABS\_on} > T_{ABS\_min}$), the minimum limit value $T_{ABS\_min}$ being less than the switch-on limit value $T_{H\_on}$ of the heating element ($T_{ABS\_on} < T_{H\_on}$), ($T \leq T_{ABS\_on}$).

11. The method for ABS control system as claimed in claim 10, comprising the further step of outputting a warning signal in a driver's cab associated with the wheeled vehicle unit upon deactivation of the ABS control system.

12. A method for ABS control of a hydraulic power brake system (1) of a wheeled vehicle unit having:
    a pressure oil source (24) supplying pressurized hydraulic oil;
    a main brake line (20, 21), configured to provide a setpoint brake pressure controlled via a brake valve (4)

that is downstream of the pressure oil source and operated via a brake pedal (7), and from which an axle brake line or wheel brake line (46, 49, 50) leading to an actuating unit (13, 15, 17, 19) of a wheel brake (12, 14, 16, 18) branches off, a valve arrangement (8) of an ABS control system, which comprises respectively a hydraulic pressure-controlled inlet valve (28, 34, 40) disposed between the main brake line (20, 21) and a respective axle brake line or wheel brake line (46, 49, 50), and a hydraulic pressure-controlled outlet valve (30, 36, 42) disposed between the respective axle brake line or wheel brake line (46, 49, 50) and an unpressurised return line (51, 52, 53), and a electromagnetically operated pilot control valve (32, 33, 38, 39, 44, 45) controlling a control pressure line (57, 58, 59, 60, 61, 62) providing a hydraulic control pressure to control each inlet valve and outlet valve (28, 30, 34, 36, 40, 42), wherein the inlet valves and outlet valves (28, 30, 34, 36, 40, 42) and the pilot control valves (32, 33, 38, 39, 44, 45) of the ABS control system for the vehicle unit or for each vehicle axle respectively are disposed together in a respective ABS modulator block (69), wherein a temperature sensor (70, 71, 72) for detecting a local oil temperature T and a heating element (73, 74, 75) for locally heating the hydraulic oil are disposed in each respective ABS modulator block (69);

the method comprising the steps of locally measuring the temperature (T) of the hydraulic oil in the control pressure line via the temperature sensor (73, 74, 75), and activating the heating element (73, 74, 75) when the measured oil temperature (T) locally measuring the temperature (T) of the hydraulic oil in the control pressure line has reached or fallen below a specified switch-on limit value $T_{H\_on}$, and deactivating the heating element when the detected oil temperature (T) has reached or exceeded a specified switch-off limit value $T_{H\_off}$ that is greater than the switch-on limit value $T_{H\_on}$.

13. The method for ABS control as claimed in claim 12, comprising the further step of deactivating the ABS control system when the detected oil temperature (T) has reached or fallen below a specified operating limit value $T_{ABS\_on}$ that is greater than a minimum limit value $T_{ABS\_min}$ for satisfying predetermined minimum requirements on the ABS control system ($T_{ABS\_on} > T_{ABS\_min}$), the minimum limit value $T_{ABS\_min}$ being less than the switch-on limit value $T_{H\_on}$ of the heating element ($T_{ABS\_on} < T_{H\_on}$), ($T \leq T_{ABS\_on}$).

14. The method for ABS control system as claimed in claim 13, comprising the further step of outputting a warning signal in a driver's cab associated with the wheeled vehicle unit upon deactivation of the ABS control system.

* * * * *